United States Patent

[11] 3,560,777

| [72] | Inventors | Werner Moeller<br>Dubendorf;<br>Walter Dreher, Hegnau, Switzerland |
|---|---|---|
| [21] | Appl. No | 849,424 |
| [22] | Filed | Aug. 12, 1969 |
| [45] | Patented | Feb. 2, 1971 |
| [73] | Assignee | Maschinenfabrik Oerlikon<br>Zurich, Switzerland |
| [32] | Priority | Aug. 19, 1968 |
| [33] | | Switzerland |
| [31] | | 12580/68 |

[54] ELECTRIC MOTOR COIL BANDAGE
11 Claims, 2 Drawing Figs.

[52] U.S. Cl..................................................... 310/270,
310/208
[51] Int. Cl....................................................... H02k 3/46
[50] Field of Search........................................ 310/208,
271, 214, 270; 174/110.44, 110.6, 110.7, 73.1;
154/43

[56] References Cited
UNITED STATES PATENTS

| 2,436,306 | 2/1948 | Johnson | 174/73.1 |
| 2,728,698 | 12/1955 | Rudner | 154/43 |
| 2,994,735 | 8/1961 | Marshall | 310/270 |
| 3,162,722 | 12/1964 | Bartos | 174/110.7 |
| 3,330,978 | 7/1967 | Pettit | 310/270 |
| 3,437,859 | 4/1969 | Gibbs | 310/270 |
| 3,450,968 | 6/1966 | Cox | 174/110.44 |
| 3,454,805 | 7/1969 | Fromm | 310/270 |

Primary Examiner—Milton O. Hirshfield
Assistant Examiner—R. Skudy
Attorney—McGlew and Toren ABSTRACT: An electric motor coil bandage has at least two or more independent coil legs of a rotor or a stator each having a face connection which includes a coil rod connected to the individual coil leg. A bandage extends around a plurality of sets of the coil rods of identical coils and a rubber elastic compressible cushion is disposed between adjacent rods and is adapted to glide relatively to the insulation surface of these rods.

PATENTED FEB 2 1971　　　　　　　3,560,777

INVENTORS
Werner Möller
Walter Dreher by
Mc Glew & Toren
ATTORNEYS

3,560,777

ELECTRIC MOTOR COIL BANDAGE

SUMMARY OF THE INVENTION

This invention relates in general to electric motor construction and, in particular, to a new and useful coil bandage for an electric motor having at least two stator or rotor coils which are independent of each other and which are oriented with their connecting rods slideable on a cushion therebetween.

In order to change by steps the speed of induction motors at constant power supply frequency, it is known to arrange in the stator several coils with different numbers of poles. These coils may be completely independent of each other and every groove of one coil may be followed at the stator circumference by a groove of the other coil. In operation, only one coil is connected to the power supply whereas the other coils are open and hence carry no current. The current heat losses of the connected coil and to a lesser extent the magnetization losses and varying cooling conditions are the cause of considerable deviations in the longitudinal expansion of the connected versus the unconnected coils. Consequently, neighboring rods may behave quite differently in respect to the change of their length. It has been customary to bandage the coils without regard to which coils belong to the various coil rods and this leads to considerable mechanical tensions particularly at the mouth of the grooves at the so-called coil knee. These tensions may result in cracks in the overstressed insulation which in turn may result in coil breakdown.

In accordance with the present invention, the disadvantages of the prior art constructions are overcome by providing sets of outer coil rods which are wrapped by the bandage and which always belong to the same coil. The rods of adjacent coils are separated by compressible cushions capable of gliding relatively to the coil insulation surface.

Accordingly, it is an object of the invention to provide an improved electric motor bandage in which there are at least two stator or rotor coils independent of each other and they each carry a respective outer coil rod which is wrapped by a bandage and which is spaced-apart by a rubber elastic compressible cushion which is adapted slide relatively to the insulation on the surface of the coils.

A further object of the invention is to provide an electric motor coil bandage which is simple in design, rugged in construction, and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

GENERAL DESCRIPTION OF THE PREFERRED EMBODIMENT

Figures 1, 2:
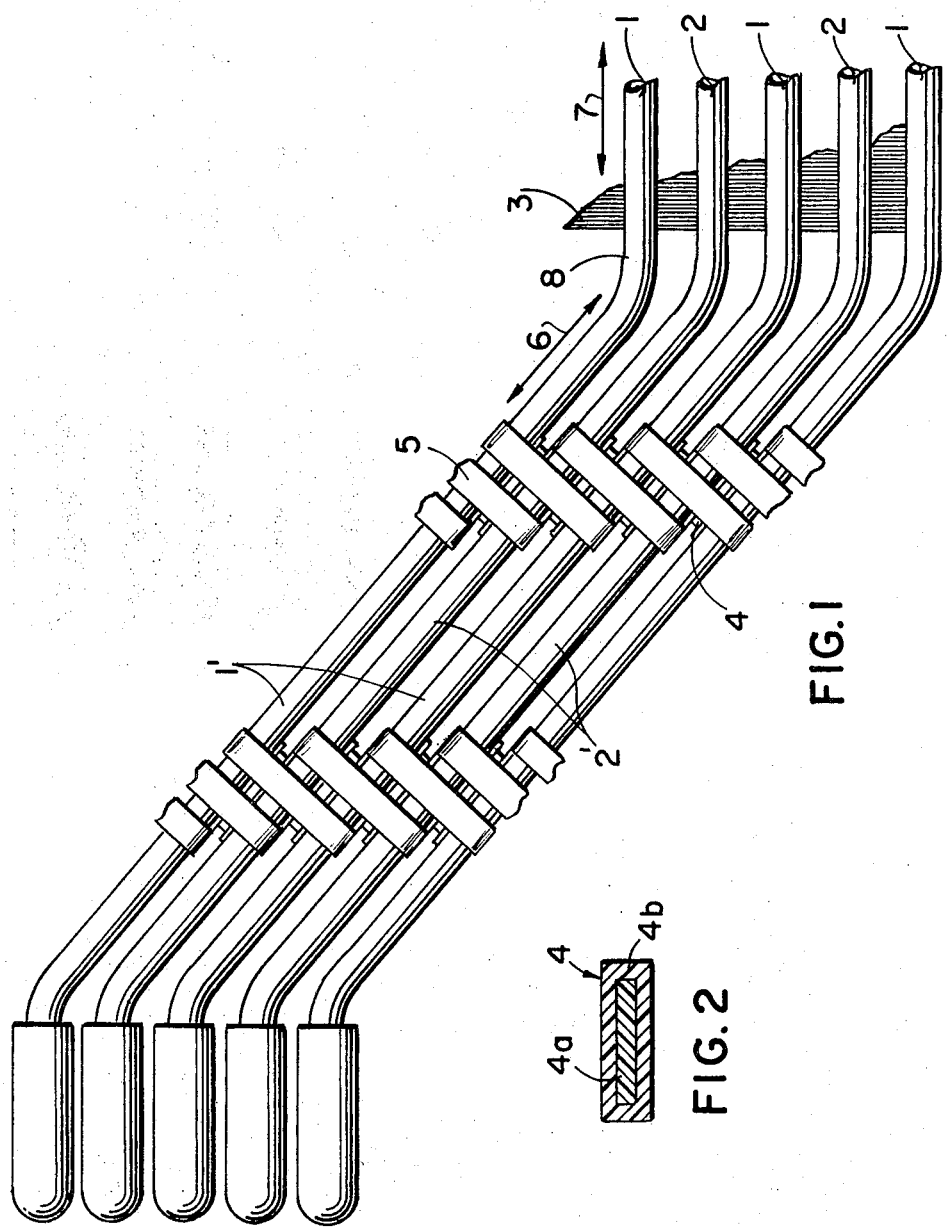
FIG. 1 is a cut away view of an electric motor coil winding constructed in accordance with the invention.
FIG. 2 is a section through a cushion shown in FIG. 1.

Referring to the drawing in particular, the invention embodied therein comprises a first coil leg generally designated 1 which is alternately arranged with a second coil leg generally designated 2 in a stator comprising a lamination stack 3. The coil legs 1 and 2 lie in grooves of the stator lamination stack 3 and they have face connections comprising coil rods or connecting rods 1′ and 2′, respectively. Cushions 4 are disposed between adjacent coils rods 1′ and 2′ of the respective coils 1 and 2 and alternate coil rods are wrapped by bandages 5 which always belong to the same coil.

During the heating and subsequent cooling of the one or the other coil 1 or 2 an expansion or contraction of the coil rods 1′ or 2′ takes place in a direction of the arrows 6 and 7. The current carrying coil including its bandages then slides relatively to the cushions 4 and therefore mechanical tensions can be reliably avoided even at the coil knee 8.

The cushions 4 must meet quite a number of specifications. They must have a rubber elastic compressibility of approximately 30 percent, a compressor strength of approximately 40 kp/cm², an impact strength of up to approximately 50 kp/cm² and sufficient abrasion resistance at the border areas between the coil and the cushion so that there will not be any damage to the conductor insulation. In addition, the cushion must be resistant to corona, ozone and temperatures of up to approximately 120° C. A cushion 4 having a specific cushion core 4a and a specific cushion cover 4b applied thereto will have the above mentioned properties. The cushion cover 4a may either enclose the cushion core completely or it may be applied only to those places which are in contact with the rod insulation.

It is expedient to produce the cushion core from a polyethyleneterephthalate felt which is first impregnated by a hydrocarbon halide, in particular by carbon tetrachloride and after drying by a methylpolysiloxane, that is a hardenable silicon rubber of low viscosity until it becomes transparent. If the operating temperatures of the motor are low the impregnate may also be polyurethane rubber. The cushion core is characterized by a great compressibility and impact strength.

In order to prevent the cushion core from abrading a silicon impregnated polyester may be used to advantage as a cushion covering. The silicon content of the mat is brought about be squeezing of the mat such as by means of a pressure roller to 40 ± 10 percent of the total weight of the cushion cover. The cushion cover is then vulcanized to the cushion core under light pressure. A fiber glass-reinforced silicon resin foil could also be used as a cushion cover, however. If ozone concentrations are small, a cushion cover could also be made from flexible polyester or epoxide resins reinforced by a polyester felt or fiber glass. Finally, a polyethyleneterephthalate film could also be used.

To assure good sliding properties of the cushion cover it is recommended that it be sprayed with a polytetrafluorethylene dispersion or to apply a polytetrafluorethylene adhesive foil to it. A fiber glass-reinforced silicon resin or polyethylenetetraphthalate foil could serve the same purpose.

As shown in the drawings, the bandages 5 wrap around the face connecting rods 1′, 1′, and 2′, 2+. In addition, the various coils can be fastened to a support ring each by means of the bandages 5. Each support ring in turn is attached to the stack of stator laminations by spring elements (not shown). Each support ring can then therefore readily follow the motion of the coil assigned to it.

In motors with vertical shafts the coils must be secured against slipping. This is expediently accomplished by making the supports of insulation materials at the location where the coil exits from the upper groove in the vicinity of the coil knee 8. The coils are fixed locally at the knee 8 by means of bandages. The coils expansion then goes upwardly from this fixed point for the upper face connecting rods while it goes downwardly for the other coil parts.

We claim:

1. An electric motor having a plurality of selectively energized coils subjected to varying cooling and magnetization differences and different expansion characteristics, comprising a rod of a first winding adapted to be connected to a power supply, a rod of a second winding on each side of said rod of a first winding, only one of said rods of a second winding being adapted to be connnected to a power supply, a rubber elastic cushion compressed between all of said rods and being capable of gliding relative to the surface of said rods, and a bandage embracing a rod of a first winding and a rod of a second winding on each side of said rod of a first winding.

2. An electric motor coil bandage, according to claim 1, wherein said cushion comprises a cushion core and a cushion covering attached thereto.

3. An electric motor coil bandage, according to claim 1, wherein said cushion comprises a cushion core and a covering around said core, said core comprising a polyethyleneterephthalate felt saturated with a hydrocarbon halide, and impregnated by a methylpolysiloxane after it is dried.

4. An electric motor coil bandage according to claim 1, wherein said cushion includes a core comprising a polyethyleneterephthalate felt impregnated by polyurethane rubber.

5. An electric motor coil bandage, according to claim 1, wherein said cushion includes a cover portion comprising a silicon impregnated squeezed polyester mat, silicon content being 40 ± 10 percent of the total weight of the cushion covering.

6. An electric motor coil bandage, according to claim 1, wherein said cushion includes a covering of a fiber glass-reinforced silicon resin foil.

7. An electric motor coil bandage, according to claim 1, wherein said cushion includes a covering comprising a flexible polyester resin reinforced by a polyester felt or fiber glass.

8. An electric motor coil bandage according to claim 1, wherein said cushion includes a covering of a flexible epoxide resin reinforced by a polyester felt or fiber glass.

9. An electric motor coil bandage, according to claim 1, wherein said cushion includes a covering of a polyethyleneterephthalate film.

10. An electric motor coil bandage, according to claim 1, wherein said cushion includes a covering having a layer of polytetrafluorethylene.

11. An electric motor coil bandage, according to claim 1, wherein said cushion includes a covering provided with a fiber glass reinforced silicon resin foil.